(12) United States Patent
Henry

(10) Patent No.: US 9,797,349 B2
(45) Date of Patent: Oct. 24, 2017

(54) COMBINED STEAM REFORMATION REACTIONS AND WATER GAS SHIFT REACTIONS FOR ON-BOARD HYDROGEN PRODUCTION IN AN INTERNAL COMBUSTION ENGINE

(71) Applicant: Southwest Research Institute, San Antonio, TX (US)

(72) Inventor: Cary A. Henry, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 14/718,531

(22) Filed: May 21, 2015

(65) Prior Publication Data

US 2016/0341157 A1 Nov. 24, 2016

(51) Int. Cl.
| | |
|---|---|
| *F02B 43/08* | (2006.01) |
| *F02M 25/12* | (2006.01) |
| *F02M 26/05* | (2016.01) |
| *F02M 26/06* | (2016.01) |
| *F02M 26/36* | (2016.01) |
| *F02M 26/43* | (2016.01) |
| *F02B 43/10* | (2006.01) |
| *F02M 27/02* | (2006.01) |
| *F02M 25/10* | (2006.01) |

(52) U.S. Cl.
CPC ............ *F02M 25/12* (2013.01); *F02M 26/05* (2016.02); *F02M 26/06* (2016.02); *F02M 26/36* (2016.02); *F02M 26/43* (2016.02); *F02B 43/10* (2013.01); *F02M 25/10* (2013.01); *F02M 27/02* (2013.01); *Y02T 10/121* (2013.01)

(58) Field of Classification Search
CPC ........ F02B 43/10; F02M 27/02; F02M 25/10; F02M 26/43
USPC .............................................. 123/3
See application file for complete search history.

(56) References Cited

U.S. PATENT DOCUMENTS

| | | |
|---|---|---|
| 1,563,608 A | 12/1925 | Wood |
| 2,113,602 A | 4/1938 | Pratt |
| 3,156,162 A | 11/1964 | Wallace et al. |
| 3,303,831 A | 2/1967 | Sherman |

(Continued)

FOREIGN PATENT DOCUMENTS

| | | |
|---|---|---|
| GB | 2110791 A | 11/1982 |
| JP | 11247665 A | 9/1999 |
| JP | 2011099375 A | 5/2011 |
| WO | 2006052993 A2 | 5/2006 |

OTHER PUBLICATIONS

International Search Report (dated Oct. 2, 2006) issued in International Patent Application No. PCT/US05/40483. (WO2006052993) (5 pgs).

(Continued)

*Primary Examiner* — Jacob Amick
*Assistant Examiner* — Charles Brauch
(74) *Attorney, Agent, or Firm* — Grossman, Tucker et al

(57) ABSTRACT

The present disclosure relates to an apparatus and method for increasing the level of hydrogen produced in an exhaust gas recirculation pathway within an internal combustion engine. A hydrocarbon water gas shift reformer is positioned in series with a water gas shift reformer within the exhaust gas recirculation pathway to improve the yield of hydrogen and to improve the relative efficiency of both catalytic procedures.

13 Claims, 6 Drawing Sheets

(56) References Cited

U.S. PATENT DOCUMENTS

| | | |
|---|---|---|
| 3,405,679 A | 10/1968 | Norris et al. |
| 3,405,697 A | 10/1968 | Marchand |
| 3,680,534 A | 8/1972 | Chavant |
| 3,805,752 A | 4/1974 | Cataldo |
| 3,924,576 A | 12/1975 | Siewert |
| 3,941,113 A | 3/1976 | Bauelin |
| 3,958,540 A | 5/1976 | Siewert |
| 3,963,000 A | 6/1976 | Kosaka et al. |
| 4,004,554 A | 1/1977 | Kosaka et al. |
| 4,059,076 A * | 11/1977 | Kosaka ............... F02B 43/10 123/3 |
| 4,108,114 A | 8/1978 | Kosaka et al. |
| 4,131,095 A | 12/1978 | Ouchi |
| 4,179,892 A | 12/1979 | Heydrich |
| 4,350,133 A | 9/1982 | Greiner |
| 4,735,186 A | 4/1988 | Parsons |
| 4,783,966 A | 11/1988 | Aldrich |
| 5,178,119 A | 1/1993 | Gale |
| 5,207,714 A | 5/1993 | Hayashi et al. |
| 5,257,600 A | 11/1993 | Schechter et al. |
| 5,297,515 A | 3/1994 | Gale et al. |
| 5,343,699 A | 9/1994 | McAlister |
| 5,379,728 A | 1/1995 | Cooke |
| 5,456,240 A | 10/1995 | Kanesaka |
| 5,515,814 A | 5/1996 | Cooke |
| 5,517,976 A | 5/1996 | Bachle et al. |
| 5,524,582 A | 6/1996 | Suh et al. |
| 5,562,085 A | 10/1996 | Kosuda et al. |
| 5,894,726 A | 4/1999 | Monnier |
| 6,009,709 A | 1/2000 | Bailey |
| 6,138,650 A | 10/2000 | Bailey |
| 6,216,458 B1 | 4/2001 | Alger et al. |
| 6,286,489 B1 | 9/2001 | Bailey |
| 6,343,594 B1 | 2/2002 | Koeslin et al. |
| 6,397,790 B1 | 6/2002 | Collier, Jr. |
| 6,425,381 B1 | 7/2002 | Rammer |
| 6,478,017 B2 | 11/2002 | Bianchi |
| 6,484,702 B1 | 11/2002 | Riley |
| 6,508,209 B1 | 1/2003 | Collier, Jr. |
| 6,536,392 B2 | 3/2003 | Widener |
| 6,543,230 B1 | 4/2003 | Schmid |
| 6,543,411 B2 | 4/2003 | Raab et al. |
| 6,609,374 B2 | 8/2003 | Feucht et al. |
| 6,655,324 B2 | 12/2003 | Cohn et al. |
| 6,672,292 B2 | 1/2004 | Fischer |
| 6,742,507 B2 | 6/2004 | Keefer et al. |
| 6,789,531 B1 | 9/2004 | Remmels |
| 6,820,415 B2 | 11/2004 | Abet et al. |
| 6,871,642 B1 | 3/2005 | Osterwald |
| 6,877,464 B2 | 4/2005 | Hitomi et al. |
| 6,877,492 B1 | 4/2005 | Osterwald |
| 6,915,776 B2 | 7/2005 | zur Loye et al. |
| 6,918,251 B2 | 7/2005 | Yanagisawa et al. |
| 6,923,149 B2 | 8/2005 | Nishimoto et al. |
| 6,945,235 B1 | 9/2005 | Bertilsson et al. |
| 7,028,680 B2 | 4/2006 | Liu et al. |
| 7,032,578 B2 | 4/2006 | Liu et al. |
| 7,140,357 B2 | 11/2006 | Wei et al. |
| 7,232,553 B2 | 6/2007 | Oh et al. |
| 7,261,064 B2 | 8/2007 | Bhaisora et al. |
| 7,290,504 B2 | 11/2007 | Lange |
| 7,384,620 B2 | 6/2008 | Bowman et al. |
| 7,389,770 B2 | 6/2008 | Bertilsson et al. |
| 7,648,785 B2 | 1/2010 | Hu et al. |
| 7,721,541 B2 | 5/2010 | Roberts, Jr. et al. |
| 7,757,677 B2 | 7/2010 | Dobrila |
| 7,779,823 B2 | 8/2010 | Winstead |
| 7,801,664 B2 | 9/2010 | Winstead |
| 7,818,959 B2 | 10/2010 | Hu et al. |
| 7,945,376 B2 | 5/2011 | Geyer et al. |
| 7,945,377 B1 | 5/2011 | Van Nieuwstadt et al. |
| 8,100,093 B2 | 1/2012 | Morgenstern |
| 8,291,891 B2 | 10/2012 | Alger, II et al. |
| 8,311,723 B2 | 11/2012 | McAlister |
| 8,387,593 B2 | 3/2013 | Ichihara et al. |
| 8,463,529 B2 | 6/2013 | Hu |
| 8,557,458 B2 | 10/2013 | Scotto et al. |
| 8,561,599 B2 | 10/2013 | Gingrich et al. |
| 8,668,752 B2 | 3/2014 | Scotto et al. |
| 8,695,540 B2 | 4/2014 | Minick |
| 8,752,532 B2 | 6/2014 | Korenaga et al. |
| 8,838,367 B1 | 9/2014 | McAlister |
| 8,893,687 B2 | 11/2014 | Gingrich et al. |
| 8,904,786 B2 | 12/2014 | Hayman |
| 8,944,034 B2 | 2/2015 | Gingrich et al. |
| 9,083,020 B2 | 7/2015 | Scotto |
| 9,091,204 B2 | 7/2015 | McAlister |
| 9,118,048 B2 | 8/2015 | Scotto |
| 9,140,220 B2 | 9/2015 | Scotto |
| 9,145,837 B2 | 9/2015 | Klingbeil |
| 9,169,773 B2 | 10/2015 | Bromberg et al. |
| 9,178,235 B2 | 11/2015 | Scotto et al. |
| 9,206,769 B2 | 12/2015 | Burrahm |
| 9,255,560 B2 | 2/2016 | McAlister |
| 9,297,320 B2 | 3/2016 | Hilditch et al. |
| 9,377,105 B2 | 6/2016 | McAlister |
| 9,453,465 B2 | 9/2016 | Bidner et al. |
| 9,464,584 B2 | 10/2016 | Gingrich et al. |
| 9,574,487 B2 | 2/2017 | Gruber et al. |
| 9,611,794 B2 | 4/2017 | Blythe et al. |
| 9,657,692 B2 | 5/2017 | Chiu |
| 2001/0015193 A1 | 8/2001 | Tanaka et al. |
| 2002/0189598 A1 | 12/2002 | Remmels |
| 2003/0121484 A1 | 7/2003 | Wang |
| 2004/0099256 A1 | 5/2004 | Stewart |
| 2005/0016792 A1 | 1/2005 | Graefenstein |
| 2005/0022450 A1 * | 2/2005 | Tan ............... B01D 53/9431 48/198.3 |
| 2006/0059896 A1 | 3/2006 | Liu et al. |
| 2006/0070587 A1 | 4/2006 | Bhalsora et al. |
| 2006/0112940 A1 | 6/2006 | Roberts, Jr. et al. |
| 2007/0028901 A1 | 2/2007 | Watakabe et al. |
| 2007/0193270 A1 | 8/2007 | Roozenboom et al. |
| 2009/0120385 A1 | 5/2009 | Munshi et al. |
| 2009/0199825 A1 | 8/2009 | Piper et al. |
| 2009/0308070 A1 | 12/2009 | Alger, II et al. |
| 2011/0031162 A1 * | 2/2011 | Drnevich ............... C10G 70/02 208/57 |
| 2011/0041495 A1 | 2/2011 | Yager |
| 2011/0146267 A1 * | 6/2011 | Hepburn ............... F01N 3/021 60/602 |
| 2012/0006288 A1 | 1/2012 | Winstead |
| 2012/0078492 A1 | 3/2012 | Freund et al. |
| 2012/0167863 A1 | 7/2012 | Kulkarni |
| 2012/0204844 A1 | 8/2012 | Gingrich et al. |
| 2012/0204845 A1 | 8/2012 | Gingrich et al. |
| 2012/0216530 A1 | 8/2012 | Flynn et al. |
| 2012/0285426 A1 * | 11/2012 | Hayman ............... F02M 35/10222 123/563 |
| 2013/0000320 A1 | 1/2013 | McKenna et al. |
| 2013/0030672 A1 | 1/2013 | Klingbeil et al. |
| 2013/0133616 A1 | 5/2013 | Klingbeil |
| 2013/0216473 A1 | 8/2013 | Nicole et al. |
| 2013/0323145 A1 | 12/2013 | Tran et al. |
| 2014/0196697 A1 | 7/2014 | Burrahm |
| 2014/0196702 A1 | 7/2014 | Gingrich et al. |
| 2014/0223903 A1 | 8/2014 | Keating |
| 2014/0261322 A1 | 9/2014 | Geckler et al. |
| 2014/0331668 A1 | 11/2014 | Bidner et al. |
| 2014/0331970 A1 | 11/2014 | Bidner et al. |
| 2015/0361927 A1 | 12/2015 | Glugla |
| 2016/0017847 A1 | 1/2016 | Hilditch et al. |
| 2016/0076488 A1 | 3/2016 | Henry |
| 2016/0245239 A1 | 8/2016 | Henry |
| 2017/0074214 A1 | 3/2017 | Chiu |

OTHER PUBLICATIONS

International Preliminary Report on Patentability/Written Opinion (dated Oct. 2, 2006) issued in International Patent Application No. PCT/US05/40483. (WO2006052993) (7 pgs).

U.S. Office Action dated May 28, 2013 issued in related U.S. Appl. No. 13/025,901 (17 pgs.).

(56) References Cited

OTHER PUBLICATIONS

U.S. Office Action dated Dec. 12, 2013 issued in related U.S. Appl. No. 13/025,901 (16 pgs.).
U.S. Office Action dated May 21, 2014 issued in related U.S. Appl. No. 13/025,901 (15 pgs.).
U.S. Office Action dated Mar. 22, 2013 issued in related U.S. Appl. No. 13/025,912 (6 pgs.).
Wu, H. et al., "Ni-Based Catalysts for Low Temperature Methane Stream Reforming: Recent Results on Ni—Au and Comparison with Other Bi-Metallic Systems", Catalysts 2013, vol. 3, pp. 563-583.
Hacarlioglu, et al; "Studies of the Methane Steam Reforming Reaction At High Pressure in a Deramic Membrane Reactor"; Abstract only—accessed Sep. 15, 2015 <<http://www.sciencedirect.com/science/article/pii/S100399530660011X>>.
Hankinson, et al; Ignition Energy and Ignition Probability of Methane-Hydrogen-Air Mixtures; accessed May 30, 2013 <<http://conference.ing.unipi.it/ichs/images/stories/papers/125.pdf>>.
Saxena, et al; "The Influence of Hydrogen and Carbon Monoxide on Structure and Burning Velocity of Methane Flames"; 2009 Fall Technical Meeting of the Western States Section of the Combusion Institute Hosted by the Univ of Cali at Irvine, CA, Oct. 26-27, 2009, Paper #09F-86, 20 pgs; accessed May 20, 2015 <<http://www.engr.ucr.edu/WSSCIConference/Exampleformat.pdf>>.
Zanfir, et al; Catalytic Combustion Assisted Methane Steam Reforming in a Catalytic Plate Reactor; Chemical Engineering Science vol. 58, pp. 3947-3960, 2003.
U.S. Office Action dated Apr. 6 2016 issued in U.S. Appl. No. 14/487,463 (21 pgs).
U.S. Office Action dated Jun. 27, 2016 issued in U.S. Appl. No. 14/631,384 (12 pgs).
U.S. Office Action dated Oct. 20, 2016 issued in U.S. Appl. No. 14/487,463 (20 pgs).
Caterpillar "Application and Installation Guide, Gas Engine Emissions"; ©2007 Caterpillar® (31 pgs).
U.S. Office Action dated Oct. 3, 2016 issued in related U.S. Appl. No. 14/851,890 (8 pgs).
U.S. Office Action dated May 1, 2017 issued in related U.S. Appl. No. 14/631,384 (13 pgs).

* cited by examiner ized octane number as well as improving combustion stability due to an increase in the burn rates and a reduction in the ignition energy requirement of the $H_2$ and CO enriched mixture.

COMBINED STEAM REFORMATION REACTIONS AND WATER GAS SHIFT REACTIONS FOR ON-BOARD HYDROGEN PRODUCTION IN AN INTERNAL COMBUSTION ENGINE

FIELD

The present disclosure relates to a combined steam reformation reaction and water gas shift reaction for on-board hydrogen production in an internal combustion engine.

BACKGROUND

For certain conventional exhaust gas recirculation (EGR) systems, exhaust gas expelled from all of the cylinders of an internal combustion engine may be collected in an exhaust manifold. A fraction of the collected exhaust gas (e.g. 5% to 30%) may then be routed from the exhaust manifold through a control valve back to an intake manifold of the engine, where it may be introduced to a stream of fresh (ambient) intake air. The remaining fraction of exhaust gas in the exhaust manifold, rather than being recirculated and recycled, generally flows to a catalytic converter of the exhaust system and, after treatment therein, may be expelled to the atmosphere through the exhaust pipe.

EGR has a history of use in gasoline spark-ignition engines, and affects combustion in several ways. First, the combustion in the cylinders of the engine may be cooled by the presence of exhaust gas, that is, the recirculated exhaust gas may absorb heat released during the combustion process. Furthermore, the dilution of the oxygen present in the combustion chamber with the exhaust gas, in combination with the cooler combustion, may reduce the production of mono-nitrogen oxides (NOx), such as nitric oxide (NO) and nitrogen dioxide ($NO_2$). Additionally, EGR may reduce the need for fuel enrichment at high loads in turbocharged engines and thereby improve fuel economy.

EGR which uses higher levels of exhaust gas may further increase fuel efficiency and reduce emissions of spark-ignition engines. However, with higher levels of exhaust gas, engines may face challenges related to EGR tolerance, which may reduce the expected fuel efficiency improvement. Challenges related to EGR tolerance may be understood to include increasing an engine's ability to process higher levels of exhaust gas without adversely affecting performance, particularly fuel economy. Thus, even if EGR tolerance may be satisfactory for engine operation at low levels of EGR, an engine may need additional modifications in structure and operational conditions to accommodate higher levels of EGR without adversely affecting engine performance.

More recently, an engine configuration has been proposed with one or more cylinders of the engine being dedicated to expelling exhaust gas for EGR, which is then directed to the intake manifold. Such cylinders may be referred to as dedicated EGR, or D-EGR, cylinders. Such a design will improve the exhaust gas recirculation tolerance of the engine by operating one cylinder rich to produce $H_2$ and CO. This richly operated cylinder is dedicated to the production of exhaust gas for direct feed into the intake manifold. The addition of $H_2$ and CO to the charge flow then improves the knock tolerance of the engine through increased octane number as well as improving combustion stability due to an increase in the burn rates and a reduction in the ignition energy requirement of the $H_2$ and CO enriched mixture.

Examples of engines with a D-EGR cylinder may be found in U.S. Patent Application Publication No. 2012/0204844 entitled "Dedicated EGR Control Strategy For Improved EGR Distribution And Engine Performance" and U.S. Patent Application Publication No. 2012/0204845 entitled "EGR Distributor Apparatus For Dedicated EGR Configuration" which are assigned to the assignee of the present disclosure and hereby incorporated by reference.

SUMMARY

An apparatus and method to process exhaust gas expelled from at least one cylinder of a plurality of cylinders of an internal combustion engine, the method comprising providing an internal combustion engine, wherein the engine includes an exhaust gas recirculation loop containing a hydrocarbon steam reformer including a steam reformation catalyst and a water gas shift reformer including a water gas shift catalyst wherein said water gas shift reformer is serially coupled downstream of said hydrocarbon steam reformer. One then introduces hydrocarbon fuel and air into one or more cylinders of the engine and operates the engine such that internal combustion occurs in one or more cylinders of the engine thereby generating an untreated exhaust gas in one or more cylinders of the engine and expelling the untreated exhaust gas from the one or more cylinders. The untreated exhaust gas may therefore contain: (1) unreacted hydrocarbon fuel and water or (2) water and no hydrocarbon fuel.

In the case that the untreated exhaust gas contains unreacted hydrocarbon and water one may optionally introduce additional hydrocarbon to the untreated exhaust gas and when the untreated exhaust gas contains water and no hydrocarbon one may introduce hydrocarbon to the untreated exhaust gas to provide a treated exhaust gas, wherein both the untreated and treated exhaust gas contain hydrocarbon and water. This is followed by introducing the untreated and/or treated exhaust gas into the hydrocarbon steam reformer and reacting the hydrocarbon and water in the untreated and/or treated exhaust gas in the presence of the steam reformation catalyst at a temperature of 400° C. to 800° C. and outputting an exhaust gas containing increased levels of carbon monoxide and hydrogen. This is then followed by introducing the exhaust gas output from the hydrocarbon steam reformer to said water gas shift reformer and reacting the carbon monoxide and water in the exhaust gas output in the presence of a water gas shift catalyst and forming carbon dioxide and hydrogen. This may then be followed by introducing the exhaust gas output to the intake manifold of the engine.

The present disclosure also relates to an apparatus to increase the level of hydrogen in exhaust gas expelled from cylinders of an internal combustion engine, the apparatus comprising an internal combustion engine including an intake manifold and an exhaust manifold and a plurality of combustion cylinders and an exhaust gas recirculation pathway configured to recirculate exhaust gas from the exhaust manifold to the intake manifold. The exhaust gas recirculation pathway includes a hydrocarbon steam reformer containing a steam reforming catalyst and a water gas shift reformer containing a water gas shift catalyst wherein the water gas shift reformer is serially coupled downstream of said hydrocarbon steam reformer.

BRIEF DESCRIPTION OF THE DRAWINGS

The above-mentioned and other features of this disclosure, and the manner of attaining them, will become more

DETAILED DESCRIPTION

The present disclosure relates to both a method and apparatus for increasing the production of hydrogen ($H_2$) in an exhaust gas recirculation system of any selected internal combustion engine. More specifically, the present disclosure relates to implementation of a serially coupled exothermic water gas shift reaction and endothermic steam reformation reaction, in an exhaust gas recirculation system, of an internal combustion engine, to increase the overall yield of $H_2$ and ensuing engine efficiency. The internal combustion engines suitable for use herein are contemplated to include any hydrocarbon fueled engine, including but not limited to the use of gasoline, diesel and natural gas.

Figure 1:
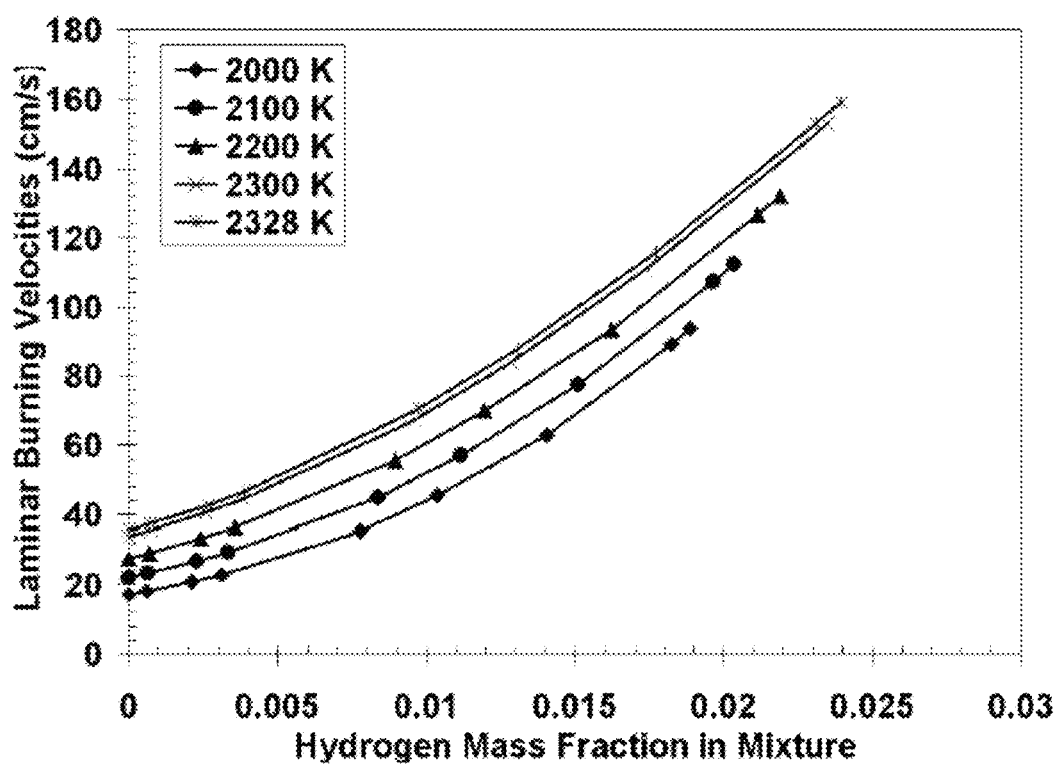
FIG. 1 illustrates the influence of hydrogen addition to the laminar burning velocity of a methane fueled flame.
Figure 2:
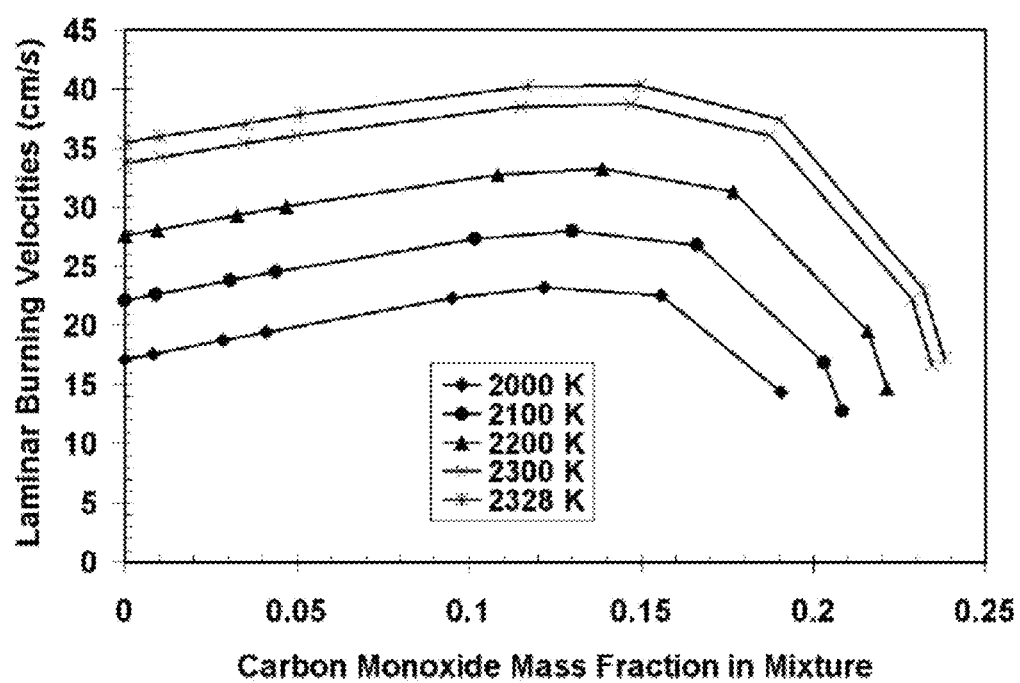
FIG. 2 illustrates the impact of carbon monoxide addition to the laminar burning velocity of a methane fueled flame.

In such context, reference is initially directed to FIG. 1, which illustrates and confirms that the addition of $H_2$ to a representative $CH_4$ fueled flame results in an increase in the burning velocity of the mixed flame. Attention is next directed to FIG. 2 which identifies the corresponding impact of CO on the laminar burning velocity of $CH_4$. As can be seen, as CO concentrations are increased up to 15%, there is a corresponding observed increase in burning velocity. However, burning velocity is then observed to decrease as additional CO is added to the mixture. Accordingly, for the applicable range of $H_2$ and CO concentration, the addition of both $H_2$ and CO to the exhaust gas charge feed will increase the burning velocity of a given mixture, with the addition of $H_2$ having, relatively speaking, a more significant effect. Accordingly, in order to further improve the yield of $H_2$ in an internal combustion engine exhaust gas recirculation stream, it is disclosed herein that one may now serially couple a water gas shift catalyst downstream of a steam reformation catalyst. This then will now present a more efficient use of both chemical reaction profiles in an exhaust gas recirculation environment. The steam reforming reaction, which is a method for producing hydrogen and carbon monoxide from a hydrocarbon fuel in the presence of water, and as specifically applied to a natural gas fueled operation, is represented below:

$$CH_4 + H_2O \rightarrow CO + 3H_2$$

The steam reforming reaction, as an endothermic reaction, may therefore be initially utilized to convert thermal energy to chemical energy in the form of $H_2$ and CO. In the case of methane fuel, the reaction preferably takes place at temperatures at or above 500° C., or in the range of 500° C. to 800° C. As a result of this endothermic reaction, the temperature of the exhaust gas stream will be reduced to a value that is less than 500° C., such as in the range of 300° C. to 500° C.

It is also worth noting that the steam reformation reaction utilized herein may also be applied in general to various hydrocarbon fuels, represented by the formula CnHm. In addition, the temperature range is more generally preferred to be in the range of 400° C. to 800° C., particularly for gasoline or diesel fuel systems. Accordingly, the more general description of the water gas shift reaction suitable for use herein is represented as follows:

$$CnHm + nH_2O \rightarrow nCO + (n+m/2)H_2$$

In the above, the value of n and m are numerical values for a given hydrocarbon undergoing a steam reformation reaction. For example, in the case of methane, n=1 and m=4.

The water gas shift (WGS) reaction is now summarized below:

$$CO + H_2O \rightarrow CO_2 + H_2$$

The water gas shift reaction above, in contrast to the steam reformation reaction, is mildly exothermic, meaning energy is released as the reaction progresses. This means that energy is lost through the process and the energy content of the $H_2$ fuel is slightly less than energy content of the CO fuel. Additionally, the water gas shift catalyst exchanges CO for $H_2$ meaning that any $H_2$ produced results in the consumption of CO. It is therefore desirable to create both CO and $H_2$ to achieve a maximum benefit of improved knock and EGR tolerance in a hydrocarbon fueled internal combustion engine.

It is useful to note that one of the limitations of the water gas shift catalysts to produce $H_2$ is that the thermodynamic equilibrium concentration of $H_2$ and CO is a function of temperature. More specifically, increasing temperature increases the kinetic rate of the forward reaction, however at the same time it also shifts the thermodynamic equilibrium to the reactants. Preferably, therefore, the water gas shift catalyst is utilized herein at a temperature of 300° C. to 500° C. to augment the production of $H_2$.

Figure 3:
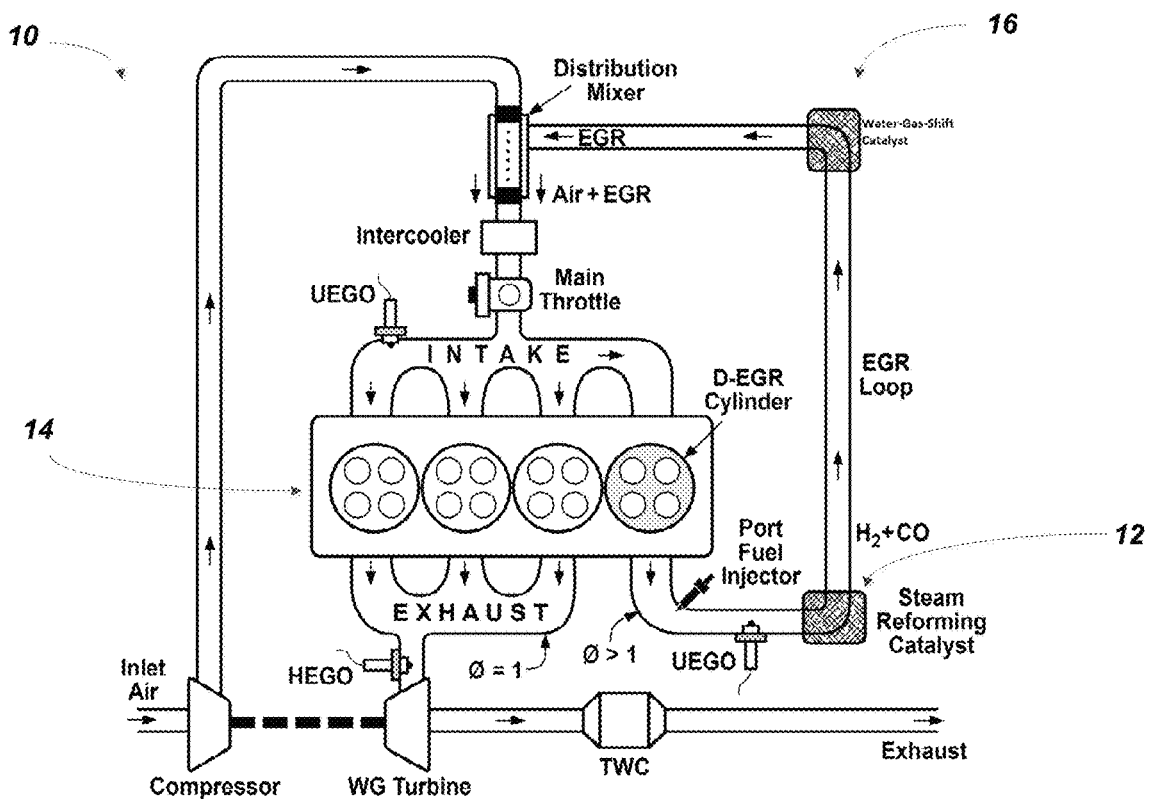
FIG. 3 illustrates a fuel reformer containing a water gas shift catalyst serially coupled downstream of a hydrocarbon steam reformer containing steam reformation catalyst as part of a four cylinder high pressure loop spark-initiated exhaust gas recirculation (EGR) system containing a dedicated exhaust gas recirculation cylinder.

Reference is made to FIG. 3 which identifies one example of the present disclosure where a water gas shift reformer containing a water gas shift catalyst is serially coupled downstream of a hydrocarbon steam reformer containing steam reformation catalyst as part of a four cylinder high pressure loop spark-initiated exhaust gas recirculation (EGR) system shown generally as item 10. Reference to a loop should be understood as providing in general a recirculation pathway for exhaust gases. One of the four cylinders is identified as the dedicated EGR (D-EGR) cylinder and is illustrated as such along with a port fuel injector (PFI) which therefore may optionally add to and/or enrich the relatively hot untreated exhaust output from the D-EGR cylinder with additional hydrocarbons to provide a treated exhaust gas mixture identified generally as Φ>1. A universal exhaust gas oxygen sensor is identified as UEGO. A heated exhaust gas oxygen sensor is identified as HEGO. A three-way catalytic converter is identified as TWC which may reduce nitrogen oxides to nitrogen and oxygen, oxidize carbon monoxide to carbon dioxide or provide oxidation of any unburnt hydrocarbons to carbon dioxide and water. In addition, it is noted that preferably 90% to 100% by volume of the exhaust gas expelled from the identified D-EGR cylinder is recirculated to the intake manifold.

It should therefore be appreciated that after leaving the D-EGR cylinder the untreated exhaust gas and/or a treated exhaust gas (i.e. exhaust gas containing hydrocarbon supplied by the PFI) may then be introduced to the steam reformation catalyst reformer identified at 12. It is worth noting that the level of hydrogen gas in the exhaust gas just prior to introduction to the hydrocarbon steam reformer will can generally fall in the range of 0.1% to 6% by volume of the exhaust gas present.

Accordingly, in the hydrocarbon steam reformer 12 any unburnt hydrocarbon and water vapor may undergo the steam reformation reaction. It is also useful to note that the port fuel injector may also include or be responsive to a separate hydrocarbon sensor such as a methane sensor to determine hydrocarbon levels in the untreated exhaust gas and automatically adjust such levels in the exhaust gas prior to introduction to the hydrocarbon steam reformer 12. Preferably, the level of hydrocarbons in the exhaust gas can then be set to fall in the range of 1.0% to 5.0% % by volume of the exhaust gas stream for treatment by the steam reformation catalyst.

The exhaust gas emerging from the exhaust manifold, either itself containing unburnt hydrocarbons or no hydrocarbons, and optionally supplied with or enriched with hydrocarbons from the PFI, is therefore now readily introduced to the hydrocarbon steam reformer 12. Preferably, the hydrocarbon steam reformer 12 containing the steam reformation catalyst is selectively positioned such that the untreated and/or treated exhaust gases are introduced and exposed to elevated temperature such as at the preferred temperature range of at least 400° C. for gasoline or diesel operation, and preferably at a temperature of at least 500° C. for a natural gas type engine. Accordingly, the hydrocarbon steam reformer 12 is selectively positioned, taking into account any cooling of the untreated and/or treated exhaust gas stream that may occur prior to introduction to the steam reformation catalyst and in consideration of maintaining a relatively close proximity to the engine, so that the heat of the engine may now be exploited to maintain the exhaust gases at a temperature sufficient for the steam reformation reaction to proceed.

The steam reformation catalyst herein preferably is selected from nickel (Ni) as the active metal. For example, the steam reformation catalyst may comprise Ni-M composition, where M=gold (Au), silver (Ag), tin (Sn), copper (Cu), cobalt (Co), molybdenum (Mo), iron (Fe), gadolinium (Gd) or boron (B). Apart from such N-M compositions, one may also use palladium (Pd) or platinum (Pt) as the steam reformation catalyst. A particularly preferred catalyst is nickel or palladium.

Figure 4:
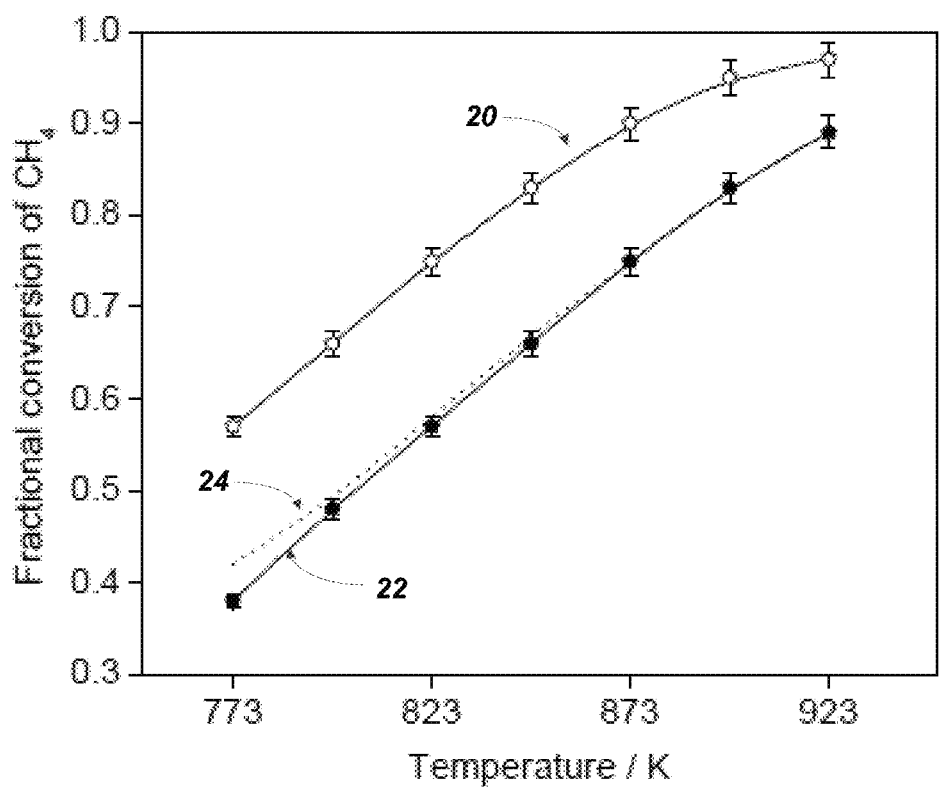
FIG. 4 illustrates the fractional conversion of methane at indicated temperatures due to the steam reformation reaction.

The hydrocarbon steam reformer 12 containing steam reformation catalyst is preferably maintained at a distance in the range of 3.0 inches to 24.0 inches from the engine cylinder block 14. Accordingly, it is contemplated that the steam reformation catalyst herein can be exclusively heated to the temperatures of at least 400° C. to 800° C. by only engine heat due to engine internal combustion operation. In such manner, as noted, the temperatures of the untreated and/or treated exhaust gases are such that they are at the preferred temperatures for the steam reformation reaction to proceed at relatively efficient levels of conversion (e.g. greater than or equal to 50% conversion). In that regard, reference is made to FIG. 4 which, for the exemplary case of a methane fuel, identifies the fractional conversion of $CH_4$ at the indicated temperature due to the steam reformation reaction. At 20 is shown the results of fractional $CH_4$ conversion versus temperature in a membrane type reactor. A membrane type reactor is reference to a reactor that continuously removed hydrogen from the reacting stream. At 22 is illustrated the fractional conversion of $CH_4$ for a packed bed reactor where there is no continuous removal of hydrogen. At 24 is the equilibrium situation which identifies the conversion of hydrocarbon to hydrogen at thermodynamic equilibrium. In the present disclosure, the hydrocarbon steam reformer may therefore assume either a membrane type configuration or packed bed configuration.

Figure 5:
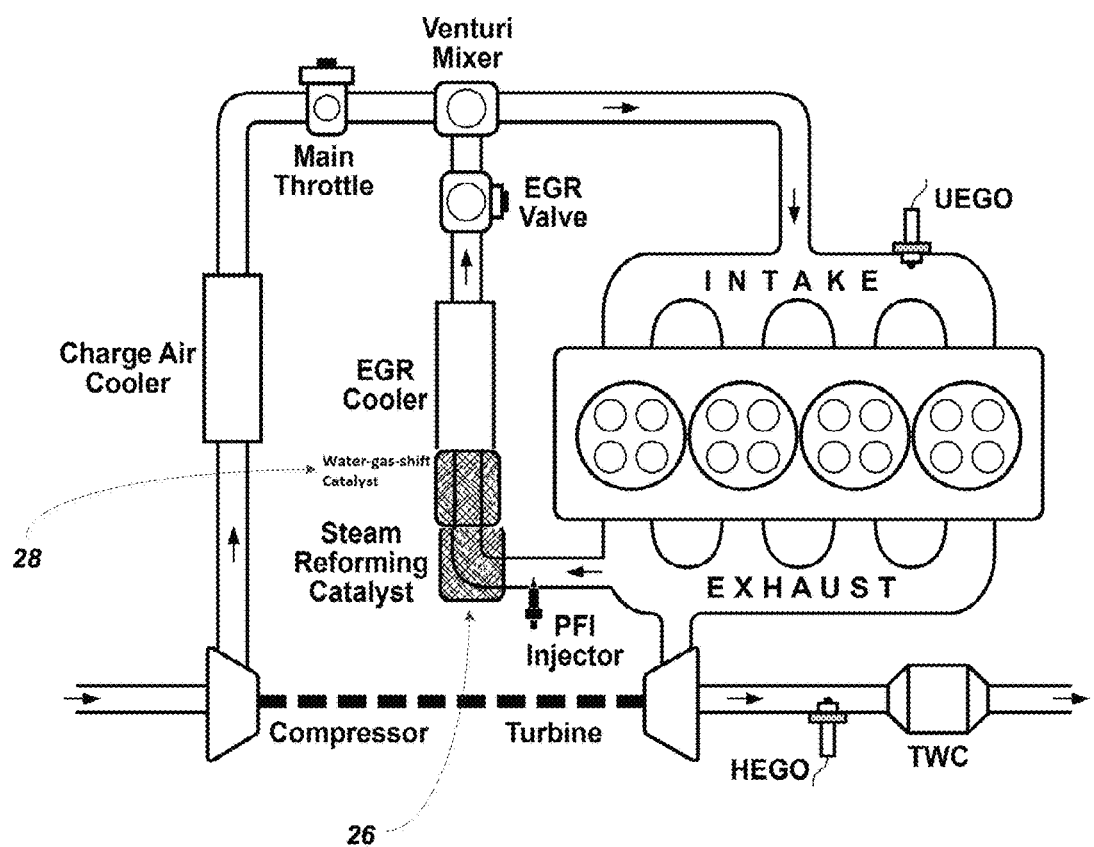
FIG. 5 illustrates a fuel reformer containing a water gas shift catalyst serially coupled downstream of a hydrocarbon steam reformer containing steam reformation catalyst as part of high pressure loop EGR system.

Once the steam reformation reaction has taken place at 12, the exhaust gases, now containing CO and $H_2$ due to the steam reformation reaction, are introduced to the water gas shift (WGS) reaction reformer at 16 (see again FIG. 3). Examples of WGS catalysts in the water gas shift reformer 16 preferably include iron oxides $Fe_3O_4$ or other transition metals and transition metal oxides. As noted herein, CO and $H_2O$ are then converted to $CO_2$ and $H_2$. Accordingly, ultimately introduced at the distribution mixer is an enriched level of hydrogen gas, which includes the additional hydrogen, created by the hydrocarbon steam reformer 12 and the water gas shift reformer 16. The amount of hydrogen gas introduced into the distribution mixer, for ensuing mixing with air and back into the intake manifold, will now contain a level of hydrogen gas of 2.0-10.0% by volume. As noted above, this amounts to a significant increase of the hydrogen in the exhaust gas emerging from the exhaust gas manifold, which as noted above, typically falls in the range of 0.1% to 6% by volume FIG. 5 illustrates another embodiment of the present disclosure as applied to a high-pressure loop EGR system (HPL-EGR). In such a system a portion of the exhaust gas is taken from upstream of the turbine as shown and ultimately reintroduced into the engine intake manifold. As can again be seen, the hydrocarbon steam reformer 26 is positioned such that it is relatively proximate to the engine such that the temperature can again be maintained in the range of 400° C. to 800° C. solely by the use of engine heat. A PFI is shown again for the optional introduction or enrichment of hydrocarbon to the exhaust gas. Following the steam reformation reaction once again the exhaust is serially coupled and introduced to the water gas shift reformer containing water gas shift catalyst shown generally at 28 followed by cooing by the EGR cooler and ultimately increased levels of $H_2$ are now introduced to the Venturi mixed and eventually into the intake manifold.

Figure 6:
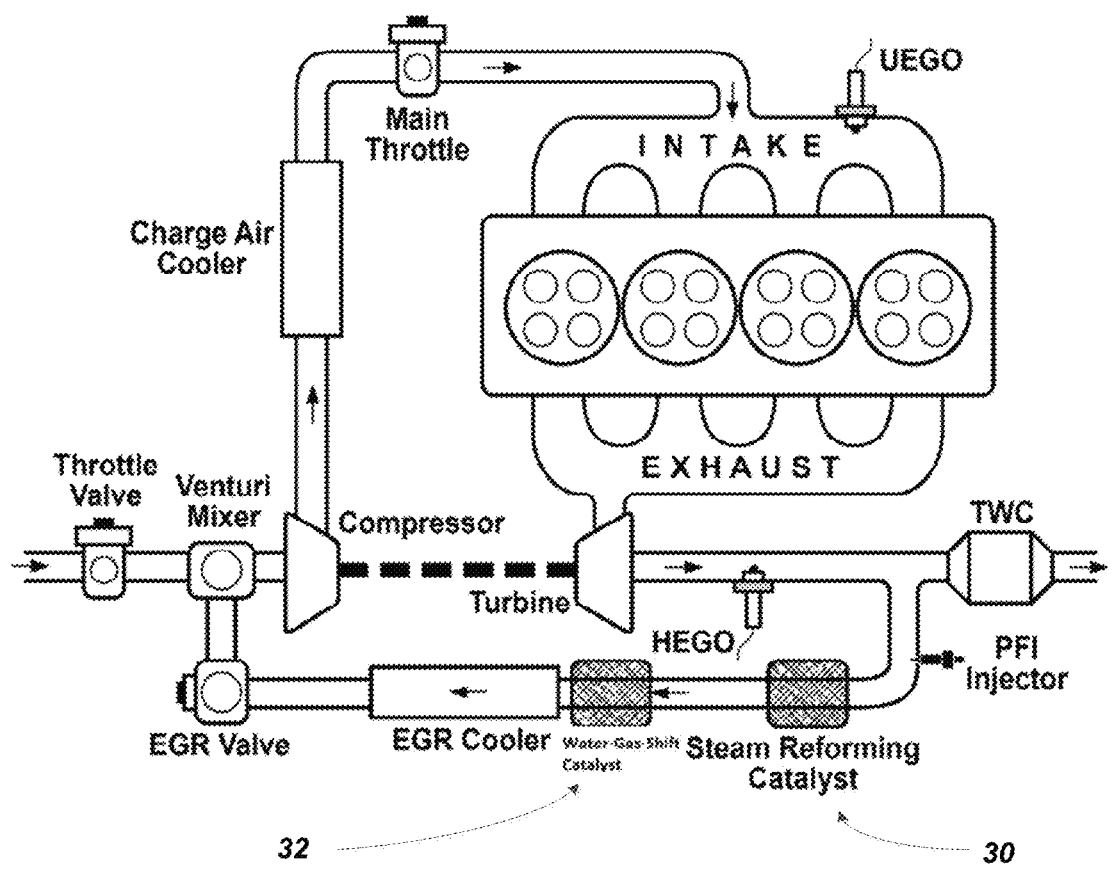
FIG. 6 illustrates a fuel reformer containing a water gas shift catalyst serially coupled downstream of a hydrocarbon steam reformer containing steam reformation catalyst as part of a low pressure loop EGR system.

FIG. 6 illustrates yet another embodiment of the present disclosure as applied to a low-pressure loop EGR system (LPL-EGR). Reference to low pressure loop is reference to the feature that directs exhaust gas from the exhaust from a point on the exhaust line downstream of the turbine as shown to a point on the air intake line upstream from the compressor. Similar to the above, a PFI injector may be positioned to introduce hydrocarbons to the untreated exhaust gas prior to the hydrocarbon steam reformer shown generally at 30. Following the steam reformation catalyst reformer the exhaust gas is again serially routed through a water gas shift catalyst reformer shown generally at 32.

It should be noted that with respect to any of the embodiments herein, operation in an environment that may contain significant levels of sulfur may be such that it can compromise the efficiency of the steam reformation catalyst. Accordingly, in such an environment, it is preferably to utilize a replaceable sulfur trap, or a sulfur trap capable of regeneration, upstream of the steam reformation catalyst in order to reduce or prevent excessive sulfur exposure of the steam reformation catalyst.

As can now be appreciated from the above, by serially coupling a hydrocarbon steam reformer with a water gas shift reformer downstream of the steam reformer, there is relatively more efficient use of both catalytic procedures, as the production of $H_2$ and CO is nearly zero at gas temperatures below 500° C. for methane as the hydrocarbon fuel. The steam reformation catalyst can be used to convert thermal energy to chemical energy in the form of $H_2$ and CO. As a result of such endothermic reaction, the temperature of the exhaust gas stream is reduced to a value of less than 500° C. As the exhaust gas stream cools below 500° C., the thermodynamics are then favorable to the water gas shift production of $H_2$ from CO and water.

The foregoing description of several methods and embodiments has been presented for purposes of illustration. It is not intended to be exhaustive or to limit the claims to the precise steps and/or forms disclosed. It is intended that the scope of the invention be defined by the claims appended hereto.

The invention claimed is:

1. A method to process exhaust gas expelled from at least one cylinder of a plurality of cylinders of an internal combustion engine, the method comprising:
   (a) providing an internal combustion engine having an intake manifold wherein the engine includes an exhaust gas recirculation pathway containing a hydrocarbon steam reformer including a steam reformation catalyst and a water gas shift reformer including a water gas shift catalyst wherein said water gas shift reformer is serially coupled downstream of said hydrocarbon steam reformer;
   (b) introducing hydrocarbon fuel and air into one or more cylinders of the engine;
   (c) operating the engine such that internal combustion occurs in one or more cylinders of the engine and generating an untreated exhaust gas in one or more cylinders of the engine and expelling said untreated exhaust gas from said one or more cylinders wherein the untreated exhaust gas contains: (1) unreacted hydrocarbon fuel and water; or (2) water and no hydrocarbon fuel;
   (d) determining a level of hydrocarbon in said untreated exhaust gas with a hydrocarbon sensor;
   (e) based on said level of hydrocarbon determined by said hydrocarbon sensor, i) in the case that the untreated exhaust gas contains unreacted hydrocarbon and water, optionally introducing additional hydrocarbon to the untreated exhaust gas and ii) when said untreated exhaust gas contains water and no hydrocarbon, introducing hydrocarbon to the untreated exhaust gas to provide a treated exhaust gas, wherein both the untreated and treated exhaust gas contain hydrocarbon and water,
   wherein said level of hydrocarbon is set in the range of 1.0% to 5.0% by volume;
   (f) introducing the untreated and/or treated exhaust gas into the hydrocarbon steam reformer and reacting the hydrocarbon and water in the untreated and/or treated exhaust gas in the presence of the steam reformation catalyst at a temperature of 400° C. to 800° C. and outputting an exhaust gas containing increased levels of carbon monoxide and hydrogen, and wherein said hydrogen in said exhaust gas output after said reaction in said water gas shift reformer is at a level of 2.0% by volume to 10.0% by volume;
   (g) introducing the exhaust gas output from step (e) to said water gas shift reformer and reacting the carbon monoxide and water in said exhaust gas output in the presence of the water gas shift catalyst and forming carbon dioxide and hydrogen; and
   (h) introducing said exhaust gas output to said intake manifold of said engine.

2. The method of claim 1 wherein the hydrogen gas in said untreated exhaust gas is at a level of 0.1% by volume to 6% by volume.

3. The method of claim 1 wherein said steam reformation catalyst in said hydrocarbon steam reformer is maintained at said temperature of 400° C. to 800° C. exclusively by generation of heat from said internal combustion engine.

4. The method of claim 1 wherein said engine includes a cylinder block and said hydrocarbon steam reformer is positioned at a distance of 3.0 inches to 24.0 inches from said cylinder block.

5. The method of claim 1 wherein operating the engine such that internal combustion occurs in one or more cylinders of the engine further comprises operating the engine such that at least one of the cylinders of the engine is a dedicated exhaust gas recirculation (D-EGR) cylinder.

6. The method of claim 1 wherein expelling the untreated exhaust gas from the cylinders of the engine includes expelling the untreated exhaust gas from the dedicated exhaust gas recirculation cylinder and the untreated exhaust gas expelled from the dedicated exhaust gas recirculation cylinder is introduced to said hydrocarbon steam reformer followed by said water gas shift reformer.

7. The method of claim 1 wherein at least one cylinder of said internal combustion engine is a dedicated exhaust gas recirculation (D-EGR) cylinder, wherein 90% to 100% by volume of the exhaust gas expelled from the dedicated EGR cylinder is recirculated in said exhaust gas recirculation pathway containing said hydrocarbon steam reformer and said water gas shift reformer connected in series.

8. The method of claim 1 wherein said internal combustion engine includes a turbine and said exhaust gas recirculation pathway comprises a high-pressure exhaust gas recirculation system wherein a portion of said exhaust gas is taken upstream of the turbine and said exhaust gas is recirculated.

9. The method of claim 1 wherein said internal combustion engine includes a turbine and said exhaust gas recirculation pathway comprises a low-pressure exhaust recirculation system wherein a portion of said exhaust gas is taken downstream of the turbine and said exhaust gas is recirculated.

10. The method of claim 1 wherein said hydrocarbon fuel comprises methane and said water gas shift reaction comprises:

$$CH_4 + H_2O \rightarrow CO + 3H_2.$$

11. The method of claim 10 wherein said steam reformation catalyst is at a temperature of 500° C. to 800° C.

12. The method of claim 11 wherein said temperature of 500° C. to 800° C. is maintained exclusively by generation of heat from said internal combustion engine.

13. The method of claim 1 wherein said water gas shift reaction is conducted at a temperature of 300° C. to 500° C.

* * * * *